April 11, 1950　　　E. L. MARTIN ET AL　　　2,503,755
AIRCRAFT LANDING GEAR

Filed Jan. 27, 1949　　　2 Sheets-Sheet 1

Eric L. Martin &
Fred A. Payne, Jr.
*INVENTORS.*

BY

April 11, 1950     E. L. MARTIN ET AL     2,503,755
AIRCRAFT LANDING GEAR

Filed Jan. 27, 1949     2 Sheets-Sheet 2

Eric L. Martin &
Fred A. Payne, Jr.
*INVENTORS.*

UNITED STATES PATENT OFFICE 2,503,755

AIRCRAFT LANDING GEAR

Eric L. Martin, Santa Monica, and Fred A. Payne, Jr., Los Angeles, Calif., assignors to North American Aviation, Inc.

Application January 27, 1949, Serial No. 73,032

9 Claims. (Cl. 244—50)

The present invention relates generally to running gears and more particularly to improvements in landing gears for aircraft and other vehicles.

This invention is directed primarily to improvements in steerable landing gear units for aircraft and the actuating systems by which such units are steered. In aircraft landing gears, and particularly the nose or tail wheels thereof, it is frequently desirable that the wheels be permitted to castor or swivel under certain conditions and that they also be steerable at the direction of the pilot. Many problems arise with respect to the design, operation and maintenance of such main landing units and their actuating systems, and such units are frequently susceptible of undesirable shimmy characteristics, and are also cumbersome and heavy, costly to construct and complicated in their construction. These difficulties are increased to certain extents where it is required that dual wheels be provided to support the weight of a heavier airplane and also where it may be necessary to retract the landing gear unit in order to reduce its resistance in flight. The above objections and difficulties have been overcome by the presently improved landing gear unit and its actuating system wherein the landing gear unit is provided with normally castoring non-shimmying dual wheels whereby they may be steered by differential braking.

The improved landing gear of the present invention consists essentially of a pair of dual wheels mounted for castoring or swivelling movements about the generally vertical axis of its main strut or spindle, as well as for rotation about their horizontal axis. The axle for the wheel rotation is journalled within an axle housing or fitting to which a pair of plate clutch units, including spot type brake actuating elements, are attached. There are also formed on the common axle for the dual wheels splined portions with which the clutch plates or discs are slidably engaged and are also normally engaged, under spring action, with a cutch portion of the wheel housing, thereby normally causing each wheel to be clutched and splined for positive rotation with each other and with their common axle. The landing gear unit is steerable to either side by applying the brake units on the opposite side, thereby declutching that wheel and braking the wheel on the side toward which it is desired to turn, the latter braking being accomplished through both clutch plates, their associated splines and the intermediate common axle.

The present invention also includes a hydraulic actuating system by which the pilot can steer the normally swivelable wheels by differential declutching and braking. The actuating system includes selective switching means whereby the wheel steering mechanism need not be operated while the airplane is in flight and automatically becomes inoperative when the landing gear is retracted. The improved landing gear construction successfully damps shimmy by insuring rotation of the respective wheels at the same speed, while providing a dual wheeled unit of the freely castorable type. The present construction accomplishes accurately controlled steering by the braking of one wheel while the other is free and at the same time gives adequate load "feel" to the pilot during the steering operation. It also has the advantage of absorbing the energy of any disturbing oscillation by a skidding of one or both wheels; it lends itself to being flexible, readily retractable and to remote control operation. The present construction further simplifies the design of dual steerable wheels in that it eliminates the need for the nut-cracker linkage and is lighter in weight and less expensive to build.

It is, accordingly, a major object of the present invention to provide an improved dual wheel landing gear unit which is normally freely castorable but selectively steerable at will. It is a further object to provide such a landing gear which inherently damps shimmy by insuring wheel rotation at the same speed and absorbs the energy of disturbing oscillations by the skidding of one or both of the wheels. It is a further object to provide a normally castorable dual wheel unit which is selectively steerable by braking one wheel when the other wheel is free, while at the same time providing adequate load "feel" to the pilot or operator.

A further object of the present invention is the provision of a steerable and retractable nose wheel of the dual wheel type which is extremely flexible in its arrangement and adapted for remote control operation. A further object resides in the provision of a novel braking and clutching arrangement for the dual wheels whereby they may be steered by declutching and differential braking. A still further object of this invention is to provide such a landing gear which is lighter in weight and less expensive to construct, and which does not require the conventional nutcracker linkage and other elements. Other objects and advantages of the present invention will occur to those skilled in the art after reading the following description, taken in conjunction with the accompanying drawings forming a part hereof, in which:

Figure 1:
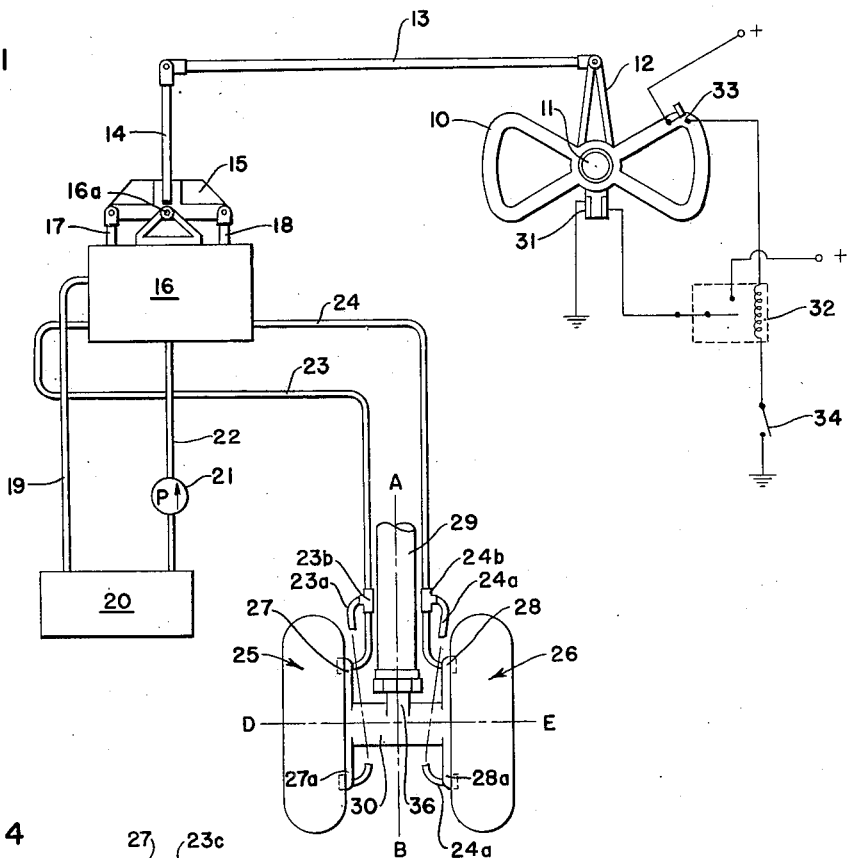
Fig. 1 is a diagrammatic view of a dual wheel landing gear and its actuating system embodying the present improvements.

Referring now to Fig. 1, the numeral 10 indicates the steering control wheel of an airplane by means of which the airplane may be steered in flight by operation of the control surfaces, or selectively steered upon the ground by the operation of the presently described steerable landing gear unit. The control wheel 10 is fixedly attached to the shaft 11, to which may be selectively engaged the actuating arm 12, the push-pull rod 13 and the lever 14 fixedly attached to the rocking arm element 15 carrying the operators 17 and 18 of the load-feel pressure regulation valve 16. The latter has a pivot 16a about which the arm 15 is rockable. A return conduit 19 extends from the valve 16 to the reservoir 20 for the hydraulic fluid, the reservoir 20 being connected to the suction side of the pressure pump 21 which discharges into the pressure supply line 22 extending to the feed side or port of the control valve 16. The latter is provided with flexible brake pressure lines or conduits 23 and 24, which extend respectively to the left and right wheels 25 and 26. These lines 23 and 24 are provided with intermediate fittings 23b and 24b for the flexible branch lines 23a and 24a respectively which extend to the lower brake units of the respective left and right clutch units 27 and 28 respectively, being sufficiently long and flexible to permit swivelling of the wheels.

The landing gear unit is provided with a main strut element 29 which may preferably contain a shock absorbing element for the absorption of shocks incurred in landing and taxiing, and the wheels 25 and 26 are freely castorable and selectively steerable about the vertical axis A—B, which may be coincident with the axis of the strut 29. The left wheel 25 is provided with upper and lower brake-clutch assemblies 27 and 27a, and the right wheel 28 has similar units 28 and 28a. As may be more clearly seen in Figs. 2 and 3, the lower end of the strut 29 provides a bearing for the wheel axle housing 30, permitting the latter to be rotated about the vertical axis A—B during castoring and steering movements of the wheels 25 and 26. An axle element 35 having a horizontal axis D—E is journalled within the axle housing 30 and the axis D—E is displaced rearwardly, as shown in Fig. 3, the distance C by which it trails the projection of the vertical axis A—B and provides the castor for the wheels as they are moved forwardly. Returning again to Fig. 1, an extension of the actuating arm 12 is provided with a solenoid clutch 31 by means of which the hub of the arm 12 is selectively engaged for rotation with the control shaft 11 upon manual closing of the switch 33 carried on the control wheel 10. Closing of the switch 33, while the landing gear is extended, and the gear retraction switch 34 is in the closed condition, energizes the relay 32 closing the solenoid circuit and permitting direct operation of the steering system from the control wheel 10.

Figure 2:
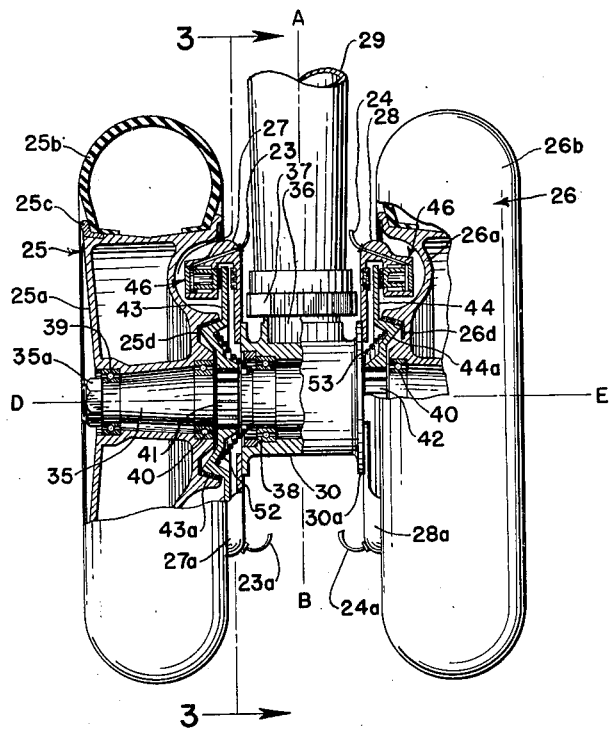
Fig. 2 is an enlarged view of the landing gear of Fig. 1 with portions of the wheels broken away to show the internal construction.
Figure 3:
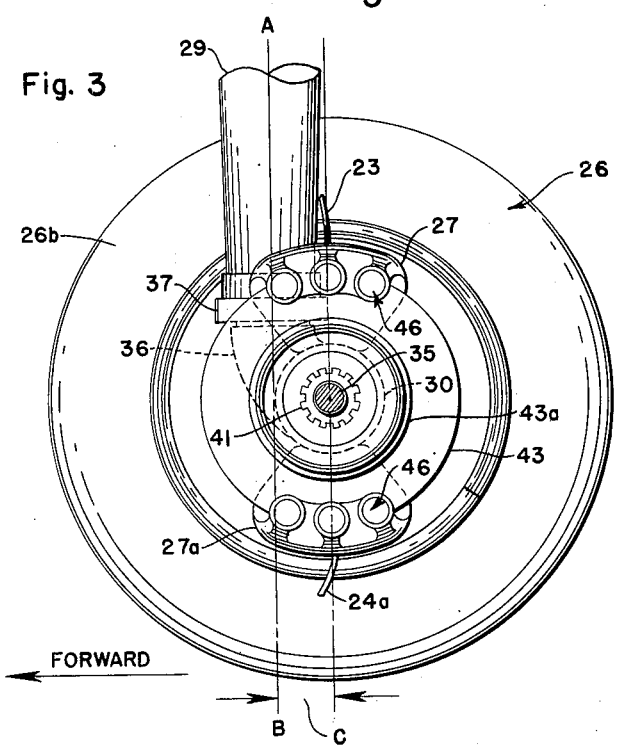
Fig. 3 is a sectional elevational view of the same as taken along the lines 3—3 of Fig. 2.

As more clearly shown in Figs. 2 and 3, the left and right wheels 25 and 26 are mounted at the opposite ends of the common axle element 35, being retained thereon by axle lock nuts 35a. Each wheel is composed of a wheel housing element as 25a and 26a, an inflatable tire 25b and 26b, a tire rim 25c, and each housing portion is provided at its inner side with an indented portion 25d and 26d forming a recess which is engageable by the clutch plate elements 43 and 44. The axle housing 30 is provided with a vertical spindle 36 which is journalled within the lower portion of the strut 29 and retained therein by the lock nut 37. Anti-friction bearings 38 are provided within the housing 30 for journalling the common axle 35 and further anti-friction bearings 39 and 40 are provided at the tapered ends of the axle 35 for the wheels 25 and 26.

Figure 4:
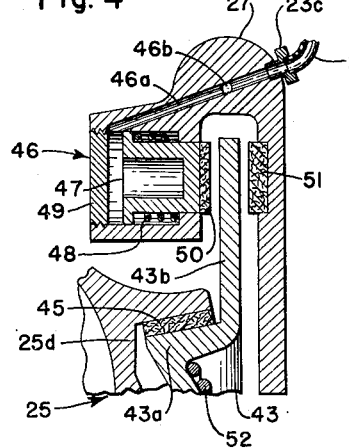
Fig. 4 is an enlarged detail view of a portion of the braking and declutching mechanism shown in the preceding figures.

Integrally formed upon the straight portion of the common axle 35 are teeth or splines 41 and 42 which are slidably engaged by the splined hub portions of the clutch plates 43 and 44. The latter have clutch face portions 43a and 44a which engage the wheel recesses 25d and 26d referred to above. A clutch lining 45 of suitable abrasive material is provided between the clutch face 43a and the wheel housing recess 25d as clearly shown in Fig. 4. Each of the clutch plates 43 and 44 has an extending disc portion such as 43b, which extends outwardly between the upper and lower brake actuating assemblies 27, 27a and 28, 28a, of each wheel. The brake-clutch assemblies 27 and 28 are provided with a plurality of spot type brake units 46 arranged arcuately adjacent the top and bottom peripheral portions of each of the clutch plates 43 and 44, the detailed section in Fig. 4 being taken through one of these brake units 46. The pressure conduit 23 is provided with a terminal fitting 23c where the fluid enters the mouth of the passageway 46a extending to the cylinder of the brake unit 46 and provided with transversely extending fluid passageways 46b to the adjacent brake units. A piston 47 is provided within each cylinder, being urged into its disengaged position toward the cylinder head 49 by the compression coil spring 48. Each brake piston 47 is provided with an annular band 50, preferably of low friction material, for bearing inwardly against the disc or clutch plate 43b and the assembly 27 is provided with a brake band 51, preferably of high friction material, on the opposite side of the disc. The clutch plate 43b is urged into engagement with the left wheel by the compression coil spring 52 and the corresponding clutch plate is normally kept engaged with the right wheel by the similar spring 53.

The operation of the improved normally castorable, selectively steerable, landing gear unit is as follows:

Under normal landing conditions where it is desired that the wheels 25 and 26 be freely castorable, the wheels will automatically damp shimmy due to disturbances to either one or both wheels, such as striking a stone or other obstruction, or from other causes. When the landing gear, or nose wheel is freely castoring in this manner, both of the wheels are splined to the co-rotating common axle 35 through the clutches 43 and 44 and the splines 41 and 42. This serves as a means of preventing shimmy inasmuch as any oscillation about the spindle axis A—B requires the wheels to rotate at different speeds. Since this is prevented by fixing the wheels to the common axle, an oscillation skids one or both wheels such that this skidding action absorbs the energy and damps the shimmy action.

When it is desired to steer the wheels 25 and 26 during taxiing or other ground maneuvers, the pilot depresses and closes the switch button 33 and since the landing gear position switch 34 is then closed with the landing gear down, the relay 32 is energized to actuate the solenoid clutch 31 for direct control of the steering arm 12 by the control wheel 10 through its shaft 11. Let us assume that it is desired to steel the airplane towards the left as viewed looking forwardly in Figs. 1 and 2, or toward the left wheel 25. The control wheel 10 is accordingly rotated toward the left, or in the counterclockwise direction, imparting similar movement to the rocking arm 15 about the pivot 16a, causing opening of the valve controlling the line 24, while maintaining the valve controlling the line 23 in its closed condition. Fluid pressure is accordingly permitted to enter the brake line 24 from the pump, the pressure line 22, and the valve 16 causing the spot type brake units 46 within the brake-clutch assemblies 28 and 28a to press inwardly at the top and the bottom against the clutch plate 44, overcoming the pressure of its spring 53. As the clutch plate 44 moves to the left in Fig. 2, (or toward the central strut 29) its engagement portion becomes disengaged from the wheel clutch face 26d and the wheel 26 is free to continue rotating freely upon its bearings 40, and with respect to the common shaft 35 to which it is no longer fixed by the spline 42. As the clutch disc 44 is moved further inwardly, or to the left, until it engages the brake lining of the brake-clutch assembly 28, the speed of rotation of the axle 35 to which the left wheel 25 is still clutched and splined as to 43 and 41, is retarded and the entire wheel and shaft assembly will start to move slowly about the vertical axis A—B of the spindle 36 and the strut 29. As the control wheel 10 and the control valve 16 are returned to their normal or neutral position the pressure fluid is cut-off in the line 24 and the spring 53 overcomes the braking force and re-engages the engagement portion 26d of the right wheel 26 causing the latter to again be clutched and splined to the common shaft axle 35 whereby the two wheels 25 and 26 are again caused to be rotated at precisely the same speed.

In other words when steering is required, one wheel is allowed to rotate freely and the other is braked to any degree desired. This drag on one side produces a moment about the spindle axis A—B which turns the spindle and accomplishes steering of the airplane. The system can be so arranged that the amount of braking effort is proportional to to the severity of the turn, thereby giving the pilot the sense of load "feel." The application of the brake cylinders 46 initially disengage the clutch on one side, allowing that wheel to rotate independently of the other, and then the further application of the brake cylinders serves to brake the other wheel through its clutch, the common axle and the free clutch plate to the axle housing and supporting structure. The braking and declutching may be done hydraulically as shown herein or alternatively it may be accomplished electrically, mechanically, or by other means.

It will, accordingly, be seen that the presently disclosed steerable nose wheel and its actuating system provides an installation having numerous advantages not heretofore obtained in normally castoring, steerable landing gears. Initially, there is a considerable saving in weight inasmuch as the conventional torque links, collars, shimmy damper and follow-up valves are eliminated. The construction, installation and servicing is appreciably inexpensive because of the simplicity of the present construction. The improved landing gear has proven safer because the maximum amount of side load induced is limited by one wheel skidding and the geometry of the installation can be readily arranged to give any desired effect. The "load-feel" steering characteristics of the present landing gear has proven preferable from the operator's standpoint to the "position-feel" which is conventional on the follow-up systems used on present large airplanes. It can also be seen that the installation is relatively flexible and readily lends itself to remote control operation and installation in dual nose wheels of the retractable landing gear type.

Other forms and modifications of the present invention, both with respect to its general arrangement and the details of its respective parts, which may occur to those skilled in the art after reading the present description, are all intended to come within the scope and spirit of this invention, as more particularly defined in the appended claims.

We claim:

1. A dual wheel landing gear assembly including a relatively fixed main strut, an axle housing journalled with respect to said strut for swivelling movements, an axle journalled with respect to said axle housing, wheels rotatably mounted upon the end portions of said axle and clutch means axially shiftable along said axle for selectively engaging either or both said wheels for positive rotation with said axle.

2. An aircraft landing gear comprising a relatively fixed member, a swivellable member journalled for castoring movements with respect to said fixed member, an axle member journalled with respect to said swivellable member, axially spaced wheels rotatably mounted upon the ends of said axle member, and clutch means rotatably carried by said axle member selectively engageable with either said wheel for positive rotation with said axle member.

3. An aircraft landing gear comprising a relatively fixed member, a swivellable member journalled for swivelling movements with respect to said member, an axle journalled within said swivellable member, axially spaced wheels rotatably mounted upon the ends of said axle member, clutch means rotatably carried by said axle member selectively engageable with either said wheel member or said swivellable member and anti-torque means co-operatively engaging said axle member with said clutch means for causing both to positively rotate together and permitting said clutch means to be shifted axially with respect to said axle member.

4. A steerable landing gear unit including a relatively fixed strut, a swivellable member journalled with respect to said strut for swivelling movements, an axle journalled for rotation upon a substantially horizontal axis with respect to said swivellable member, laterally spaced wheels journalled for free rotation upon the ends of said axle member, clutch means rotatably associated with said axle member normally engaging said wheels for their positive rotation with said axle member, and means for steering said landing wheels arranged to free one of said wheels for relative rotation with respect to said axle member and to arrest the rotation of the other said wheel by braking the relative rotation between said clutch means and said swivellable member.

5. A steerable landing gear unit including a relatively fixed strut, a swivellable member journalled with respect to said strut for swivelling movements, an axle journalled for rotation upon a substantially horizontal axis with respect to said swivellable member, laterally spaced wheels journalled for free rotation upon the ends of said axle member, clutch means rotatably associated with said axle member normally engaging said wheels for their positive rotation with said axle member, and means for steering said landing wheels arranged to free one of said wheels for relative rotation with respect to said axle member and to arrest the rotation of the other said wheel by braking the relative rotation between said clutch means and said swivellable member, said clutch means including anti-torque elements fixedly carried by said axle member for causing said clutch means to positively rotate with said axle member while permitting relative axial movements therebetween.

6. A steerable landing gear unit including a relatively fixed strut, a swivellable member journalled with respect to said strut for swivelling movements, an axle journalled for rotation upon a substantially horizontal axis with respect to said swivellable member, laterally spaced wheels journalled for free rotation upon the ends of said axle member, clutch means rotatably associated with said axle member normally engaging said wheels for their positive rotation with said axle member, and means for steering said landing wheels arranged to free one of said wheels for relative rotation with respect to said axle member and to arrest the rotation of the other said wheel by braking the relative rotation between said clutch means and said swivellable member, said clutch means including anti-torque elements fixedly carried by said axle member for causing said clutch means to positively rotate with said axle member while permitting relative axial movements therebetween, said steering means including brake actuators fixedly carried by said swivellable member arranged to impart axial movement of said clutch means with respect to said axial member for disengagement of one wheel and arrest of the rotation of the other said wheel.

7. A steerable nose wheel for aircraft including a retractable main strut, an axle housing member swivellable about the axis of said main strut, a transverse axle rotatably carried by said axle housing member, wheels freely rotatably mounted upon the lateral extremities of said axle, clutch means rotatably carried by said axle and shiftable axially with respect thereto for alternate engagement with either said wheel or said axle housing member, hydraulic actuator means carried upon said swivellable housing member for the axial movement of said clutch means, a rotatable control wheel, a source of hydraulic pressure, a control valve in communication with said hydraulic pressure source and said hydraulic actuators, and mechanism selectively operable for transmitting control movements of said control wheel through said control valve for the freeing of one of said wheels and the braking of the other said wheel for steering said nose wheel.

8. A steerable nose wheel for aircraft including a retractable main strut, an axle housing member swivellable about the axis of said main strut, a transverse axle rotatably carried by said axle housing member, wheels freely rotatably mounted upon the lateral extremities of said axle, clutch means rotatably carried by said axle and shiftable axially with respect thereto for alternate engagement with either said wheel or said axle housing member, hydraulic actuator means carried upon said swivellable member for the axial movement of said clutch means, a rotatable control wheel, a source of hydraulic pressure, a control valve in communication with said hydraulic pressure source and said hydraulic actuators, mechanism selectively operable for transmitting control movements of said control wheel to said control valve for the freeing of one of said wheels and the braking of the other said wheel for steering said landing gear unit, and limit switch means associated with said landing gear for preventing the selective operation of said control valve by said control wheel when said landing gear unit is in its retracted position.

9. In aircraft, a steering control system including a retractable landing gear strut, dual wheels swivelly and rotatably associated with said landing gear strut, hydraulic actuator means for freeing one of said wheels for rotation with respect to said strut while arresting the rotation of the other said wheel, a source of hydraulic pressure, a control valve in communication with said pressure source, conduits interconnecting said hydraulic pressure source with said hydraulic actuators on said landing gear, a rotatable control wheel for steering said aircraft in flight, operating mechanism operatively associated with said control valve, a solenoid clutch arranged upon being energized to positively engage said control wheel with said valve operating mechanism, position switch means operatively associated with said retractable landing gear, and manually actuated switch means for energizing said solenoid clutch for manual valve operation conditioned by the closing of said automatic switch upon extension of said landing gear to prevent manual steering during its retracted condition.

ERIC L. MARTIN.
FRED A. PAYNE, Jr.

No references cited.